(12) United States Patent
Cheng et al.

(10) Patent No.: US 10,268,656 B1
(45) Date of Patent: Apr. 23, 2019

(54) USING CACHE AND BLOOM FILTERS FOR URL LOOKUPS

(75) Inventors: Yonghui Cheng, Cupertino, CA (US);
Siu-Wang Leung, Fremont, CA (US);
Wilson Xu, San Jose, CA (US); Liang Li, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 694 days.

(21) Appl. No.: 13/111,131

(22) Filed: May 19, 2011

(51) Int. Cl.
*G06F 17/30* (2006.01)
*G06F 16/957* (2019.01)

(52) U.S. Cl.
CPC ................. *G06F 16/9574* (2019.01)

(58) Field of Classification Search
None
See application file for complete search history.

(56) References Cited

U.S. PATENT DOCUMENTS

| 6,799,251 | B1* | 9/2004 | Jacobs | G06F 17/30902 |
| | | | | 707/E17.12 |
| 7,454,418 | B1 | 11/2008 | Wang | |
| 7,870,161 | B2 | 1/2011 | Wang | |
| 2003/0005036 | A1* | 1/2003 | Mitzenmacher | 709/203 |
| 2004/0128270 | A1* | 7/2004 | Bachman et al. | 707/1 |
| 2005/0033803 | A1* | 2/2005 | Vleet et al. | 709/203 |
| 2011/0191342 | A1* | 8/2011 | Cohen et al. | 707/737 |

* cited by examiner

*Primary Examiner* — Amanda L Willis
(74) *Attorney, Agent, or Firm* — Van Pelt, Yi & James LLP

(57) ABSTRACT

Enforcing a policy based at least in part on URL information is disclosed. A uniform resource locator (URL) is received. A portion of the URL, or a transformation thereof, is matched against a bloom filter. Based on a result of the match, a first query is performed. A policy is enforced based at least in part on a category received as a result of a second query. In some cases, the first and second query are the same.

21 Claims, 6 Drawing Sheets

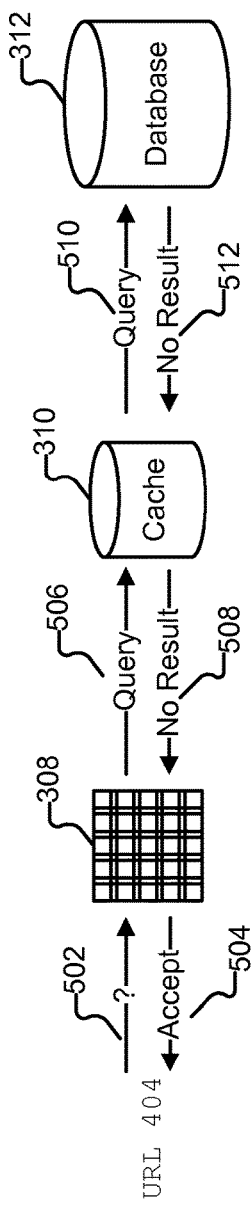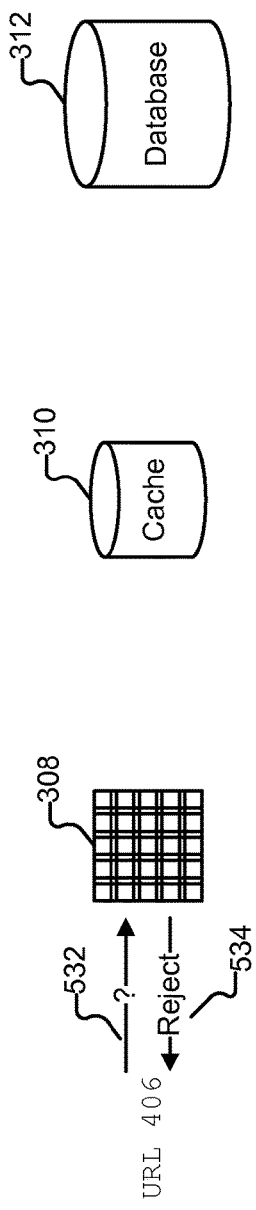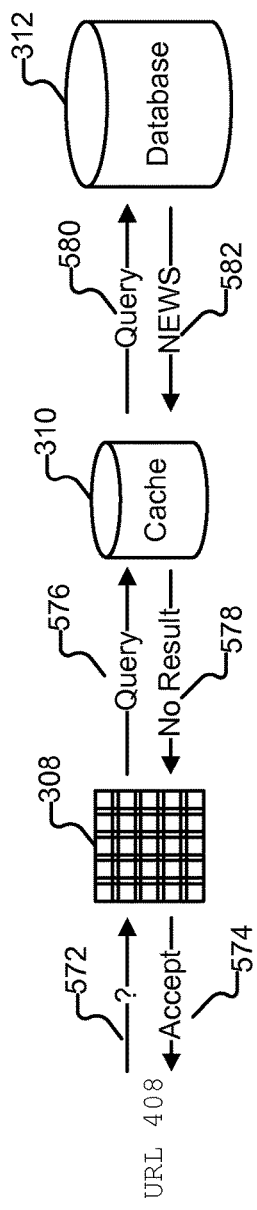

US 10,268,656 B1

USING CACHE AND BLOOM FILTERS FOR URL LOOKUPS

BACKGROUND OF THE INVENTION

Firewalls and other security devices typically enforce policies against network transmissions based on a set of rules. In some cases, the rules may be based on uniform resource locator (URL) information, such as by preventing a user from accessing a specific URL (e.g., denying access to http://www.example.com), or by preventing a user from accessing a category of the URL (e.g., denying access to sites classified as "social networking" sites or "pornographic" sites). Unfortunately, given the sheer volume of URLs in existence, it can be difficult to efficiently match rules that make use of URL information.

BRIEF DESCRIPTION OF THE DRAWINGS

Various embodiments of the invention are disclosed in the following detailed description and the accompanying drawings.

FIG. 5A illustrates a representation of processing performed by a policy enforcement appliance in some embodiments.

FIG. 5B illustrates a representation of processing performed by a policy enforcement appliance in some embodiments.

FIG. 5C illustrates a representation of processing performed by a policy enforcement appliance in some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
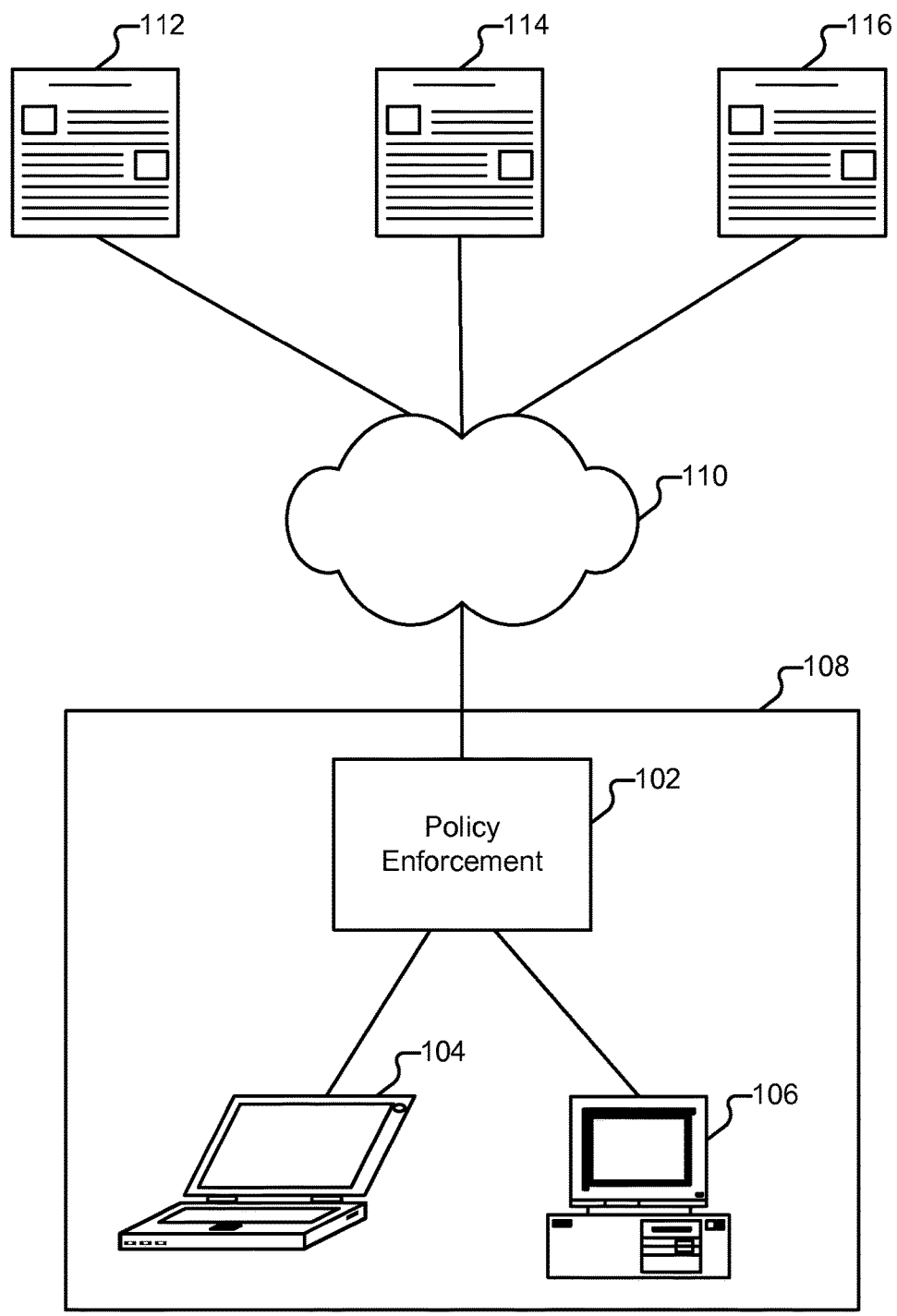
FIG. 1 illustrates an embodiment of an environment in which policies that include URL information are enforced.

FIG. 1 illustrates an embodiment of an environment in which policies that include URL information are enforced. In the example shown, clients 104 and 106 are a laptop computer and desktop computer, respectively, present in an enterprise network 108. Policy enforcement appliance 102 (also referred to herein as "appliance 102") is configured to enforce policies regarding communications between clients, such as clients 104 and 106, and nodes outside of enterprise network 108 (e.g., reachable via external network 110). One example of a policy is a rule prohibiting any access to site 112 (a pornographic website) by any client inside network 108. Another example of a policy is a rule prohibiting access to social networking site 114 by clients between the hours of 9 am and 6 pm. Yet another example of a policy is a rule allowing access to streaming video website 116, subject to a bandwidth or other consumption constraint. Other types of policies can also be enforced, such as ones governing traffic shaping, quality of service, or routing with respect to a given URL, pattern of URLs, category of URL, or other URL information. In some embodiments, policy enforcement appliance 102 is also configured to enforce policies with respect to traffic that stays within enterprise network 108.

The functionality provided by policy enforcement appliance 102 can be implemented in a variety of ways. Specifically, policy enforcement appliance 102 can be a dedicated device or set of devices. The functionality provided by appliance 102 can also be integrated into or executed as software on a general purpose computer, a computer server, a gateway, and/or a network/routing device. Further, whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable. As one example, multiple bloom filters may be included.

Figure 2:
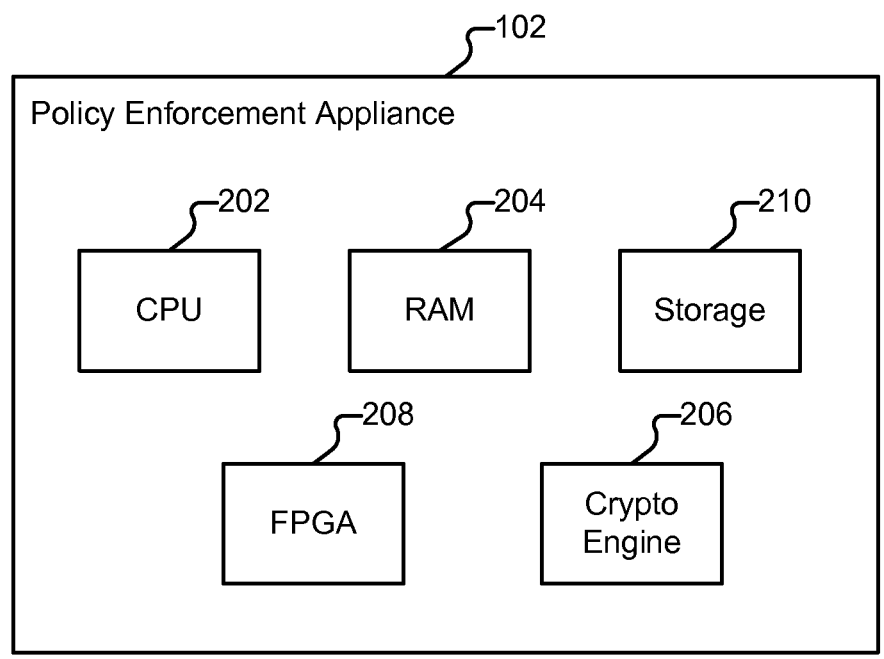
FIG. 2 illustrates an embodiment of a policy enforcement appliance.

FIG. 2 illustrates an embodiment of a policy enforcement appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Figure 3:
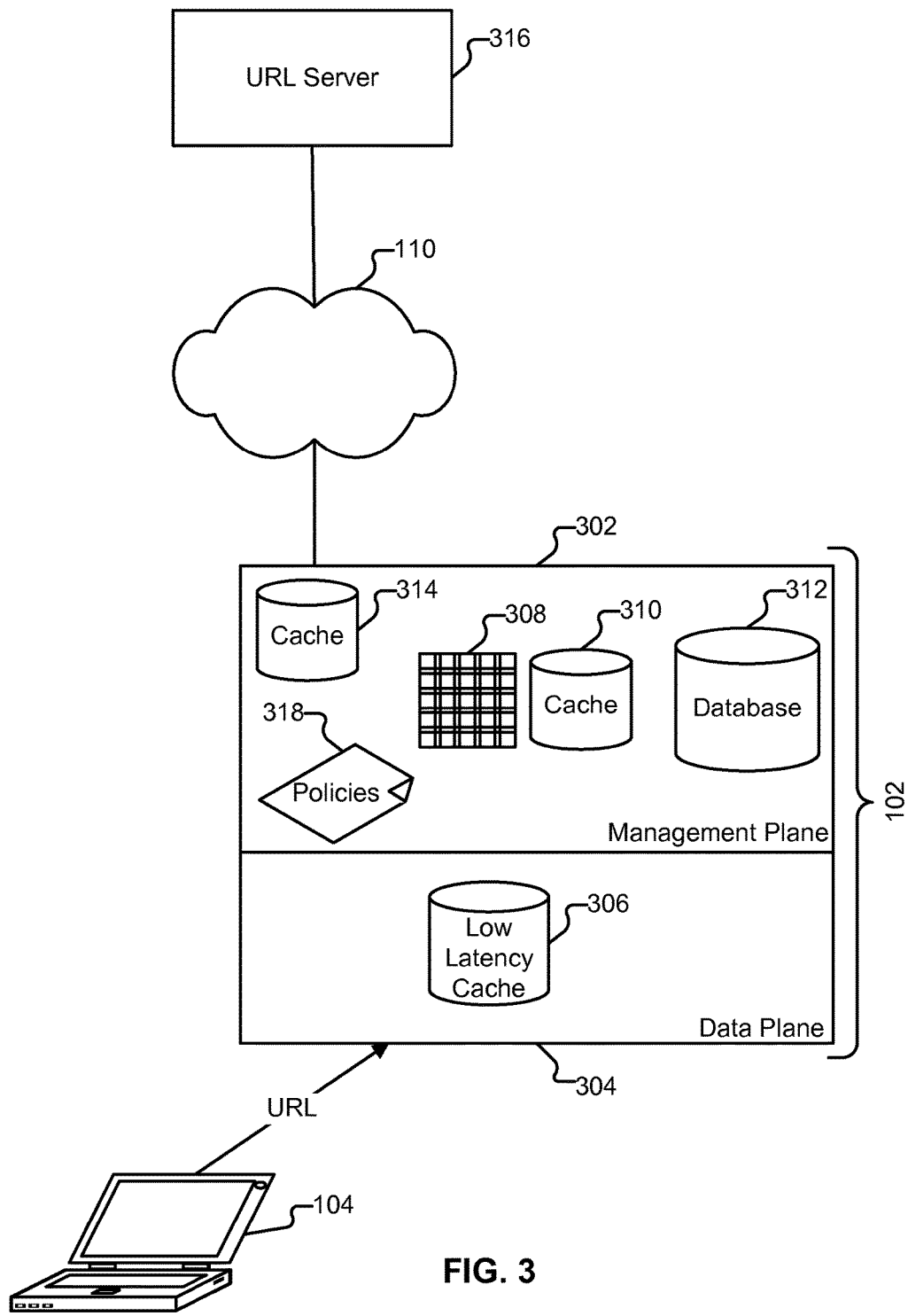
FIG. 3 illustrates an embodiment of a policy enforcement appliance.

FIG. 3 illustrates an embodiment of a policy enforcement appliance. In the example shown, the functionality of policy enforcement appliance 102 is implemented in a firewall. Specifically, appliance 102 includes a management plane 302 and a data plane 304. The management plane is responsible for managing user interactions, such as by providing a user interface for configuring policies (318) and viewing log data. The data plane is responsible for managing data, such as by performing packet processing (e.g., to extract URLs) and session handling. In various embodiments, a scheduler is responsible for managing the scheduling of requests (e.g., as presented by data plane 304 to management plane 302, or as presented by management plane 302 to URL server 316).

One task performed by the firewall is URL filtering. Suppose network 108 belongs to a company, "ACME Corporation." Specified in appliance 102 are a set of policies 318, some of which govern the types of websites that employees may access, and under what conditions. As one example, included in the firewall is a policy that permits employees to access news-related websites. Another policy included in the firewall prohibits, at all times, employees from accessing pornographic websites. Also included in the firewall is a database of URLs and associated categories. Other information can also be associated with the URLs in the database instead of or in addition to category information, and that other information can be used in conjunction with policy enforcement.

In some embodiments, the database is provided by a third party, such as through a subscription service. In such a scenario, it is possible that instead of the URLs being directly stored in database 312, a transformation is applied to the URLs prior to storage. As one example, MD5 hashes of URLs can be stored in database 312, rather than the URLs themselves. The URLs stored in database 312 (or transformations thereof) represent the top n URLs for which access is most likely to be sought by users of client devices, such as client 104, where n can be configured based on the computing and other resources available to appliance 102. As one example, database 312 includes 20 million URLs and is stored in storage 210. A bloom filter 308 is compiled from the contents of database 312 and is loaded into RAM 204. In some embodiments, the bloom filter is compiled as a bitmask. Whenever changes are made to database 312 (e.g., as an update provided by a vendor), bloom filter 308 is recompiled. Also included in the firewall are various caches 306, 312, and 314, also loaded into RAM 204. In some embodiments, all or some of caches 306, 312, and 314 are omitted from appliance 102 and the processing described herein is adapted accordingly. Additional detail regarding components shown in FIG. 3 will be provided below.

When a user of client 104 (an employee referred to herein as "Alice") attempts to engage in activities such as web surfing, communications from and to the client pass through policy enforcement appliance 102. As one example, suppose Alice has launched a web browser application on client 104 and would like to visit an arbitrary web page. Appliance 102 is configured to evaluate the URL of the site Alice would like to visit and determine whether access should be permitted.

Figure 4A:
FIG. 4A illustrates an example of a URL.
Figure 4B:
FIG. 4B illustrates a portion of a URL.
Figure 4C:
FIG. 4C illustrates a portion of a URL.
Figure 4D:
FIG. 4D illustrates a portion of a URL.

FIG. 4A illustrates an example of a URL (402) and FIGS. 4B-4D illustrate portions of URL 402. In particular, FIG. 4B illustrates URL 402 up through the first subpath, FIG. 4C illustrates the hostname portion of URL 402, and FIG. 4D illustrates the domain portion of URL 402. Portions 404-408 are also referred to herein as "URLs 404-408." In some embodiments, in the processing described in more detail below, a match against the most specific portion of URL 402 (e.g., URL 404) will be first attempted, with fallbacks to more generalized versions of the URL (e.g., URLs 406, and 408, respectively).

Suppose Alice would like to visit URL 402—the California-specific front page of an online news service—and enters that URL into her browser. In some embodiments, the URL is evaluated by appliance 102 as follows. In the first stage of the evaluation, the data plane consults cache 306 for the presence of each of URLs 404, 406, and 408, in order, until a match is found. If one of the URLs is present, the associated category that is also stored in cache 306 is used to enforce any applicable policies 318. If none of the URLs are present in cache 306, a temporary entry is inserted into cache 306 indicating that the URL is being resolved. As one example, a URL being resolved is assigned a temporary category of "UNRESOLVED." In some embodiments, an entry for each of URLs 404-408 (and a corresponding status of "UNRESOLVED") is included in cache 306. In other embodiments, only one entry is made, such as an entry for URL 404. Additional requests received by appliance 102 for access to URL 402 (or portions thereof) will be queued pending the resolution. In various embodiments, a timeout condition is placed on UNRESOLVED entries included in cache 306, such that if the entry is not updated within a specified period of time, the entry is removed.

Assuming the URL remains unresolved, the data plane sends a request to the management plane for evaluation of the URL. The next stage of evaluation is for the management plane to perform a match against bloom filter 308. URL 404 is checked first, as follows: URL 404 is transformed as applicable (e.g., an MD5 hash of URL 404 is computed). For the remainder of the discussion of this example, no distinction will be made between the URL and the MD5 (or other transformation) of the URL, to aid in clarity. It is to be assumed that if database 312 stores MD5 hashes, the queries performed against it (and the corresponding bloom filter and queries against the bloom filter) will be performed using MD5 (or other applicable) transformations of URLs.

A REJECT response, if received from bloom filter 308 for URL 404, indicates with 100% confidence that URL 404 is not present in database 312. An ACCEPT response indicates that URL 404 is present in database 312, subject to a given false positive rate. The desired false positive rate of bloom filter 308 is configurable and is in some embodiments set at 10%, meaning that an ACCEPT response indicates, with 90% confidence, that the URL is present in database 312. Additional detail of how elements 308, 310, and 312 are used to process URLs is provided with reference to FIGS. 5A-5C.

FIGS. 5A-5C illustrate representations of processing performed by a policy enforcement appliance in some embodiments. In the examples shown, assume URL 408 is present in database 312 (i.e., an MD5 hash of URL 408 is present), while URLs 404 and 406 are not. Further, assume that bloom filter 308 will indicate a false positive for URL 404. First, a match is performed using URL 404 (502). Bloom filter 308 reports an "accept," (504) meaning that there is a 90% chance that URL 404 is present in database 312. Cache 310 is evaluated for the presence of URL 404 (506). URL 404 is not present in the cache (508), and so a query of database 312 is performed using URL 404 (510). As mentioned above, the ACCEPTance of URL 404 by the bloom filter was a false positive. URL 404 is not present in database 312. Accordingly, the query of database 312 for URL 404 will also fail (512). Next, a match against bloom filter 308 for URL 406 is performed (532). The bloom filter reports a REJECT (534), indicating with 100% confidence that the URL is not present in database 312. There is accordingly no need to perform lookups against cache 310 or database 312 using URL 406. Finally, a match against bloom filter 308 for URL 408 is performed (572). The bloom filter reports an ACCEPT, (574) meaning that there is a 90% chance that URL 408 is present in database 312. Cache 310 is evaluated for the presence of URL 408 (576). URL 408 is not present in the cache (578), and so a query of database 312 is performed using URL 408 (580). In this case, URL 508 is present in database 312 and so the corresponding category NEWS is returned (582) and ultimately provided to data plane 304, which will update the entry in cache 306 by changing the UNRESOLVED category to NEWS. In some embodiments, only the finally matched URL (408) is updated in cache 306. In other embodiments, entries for each of URLs 404, 406, and 408 are updated in cache 306 with a NEWS category. The category will be used by the firewall to enforce any applicable rules. In this case, for example, Alice's attempt to access URL 402 with her browser will be allowed, because her request has been associated with an attempt to access a NEWS site, which is a permissible use. Cache 310 is also updated to include the returned category and URL 408 (i.e., its MD5 hash). In some embodiments, cache 310 is also updated when result 512 is returned. In that case, URL 404 is included in cache 310 along with a category of UNKNOWN. In various embodiments, when result 582 is returned, the UNKNOWN category included in cache 310 for URL 404 is modified to match the result.

Returning to the description of FIG. 3, assume that none of URLs 404-408 are present in database 312. The next phase of evaluation performed by the management plane would be to consult cache 314 to see if any of the URLs are present therein. As with the previous phases, if one of the URLs is present, the corresponding category (e.g., "NEWS") will be returned as a result and can be used by the firewall in policy enforcement (and included in cache 306). If the URLs are also absent from cache 314, one or more remote URL servers, such as URL server 316, is queried. In some embodiments, URL server 316 is made available by the provider of the contents of database 312, and contains URL information that supplements the information included in database 312 (e.g., by including many millions of additional URLs and corresponding categories). URL server 316 can also be under the control of the owner of appliance 102 or any other appropriate party. In various embodiments, a bloom filter corresponding to the data stored by URL server 316 is included in appliance 102.

In the event that URLs 404-408 are also absent from URL server 316, a category of UNKNOWN will be returned and appropriate policies applied, based on the category, such as by blocking access to URL 402. Cache 306 can also be updated by switching the temporary category of UNRESOLVED to UNKNOWN. As with cache 310, cache 314 is updated based on results returned by URL server 316. In some embodiments, URLs with UNKNOWN categorization have a timeout, thus allowing for resolution of the categorization during a subsequent request.

Figure 6:
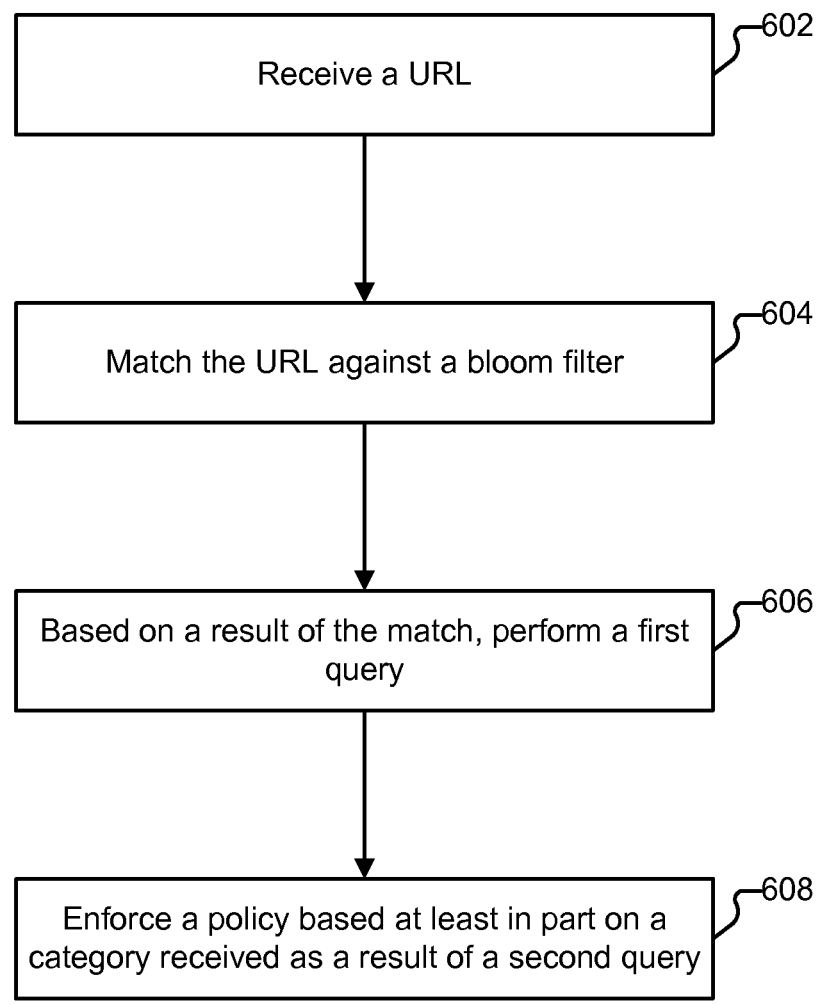
FIG. 6 illustrates an embodiment of a process for enforcing a policy based at least in part on URL information.

FIG. 6 illustrates an embodiment of a process for enforcing a policy based at least in part on URL information. In some embodiments, the process shown in FIG. 6 is performed by policy enforcement appliance 102 and, in various embodiments, multiple instances of the process shown in FIG. 6 or portions thereof are performed in parallel on appliance 102, as applicable. The process begins at 602 when a URL is received. As one example, at 602 a URL is received when data plane 304 extracts a URL out of a packet received from client 104. At 604, the URL is matched against a bloom filter. In various embodiments, what is matched is a portion of the URL (e.g., portions 404-408 of URL 402), and/or a transformation of the URL (e.g., an MD5 hash of the URL or URL portion). As one example of the processing performed at 604, URL 404 is matched against bloom filter 308 (as illustrated in FIG. 5A at 502). As an alternate example of the processing performed at 604, URL 408 is matched against bloom filter 308 (as illustrated in FIG. 5C at 572). At 606, a first query is performed, based on a result of the match. As one example of the processing performed at 606, query 510 is performed. As an alternate example of the processing performed at 606, query 580 is performed. Finally, at 608, a policy is enforced based at least in part on a category received as a result of a second query. As one example of the processing performed at 608, a policy is enforced based on the receipt of the "NEWS" category. In some cases, the first and second query may be different (e.g., where the first query is query 576 and the second query is 580; where the first query is query 506 or query 510 and the second query is query 580; or where the first query is performed against database 312 and the second query is performed against cache 314 or remote URL server 316). In some cases, such as where cache 310 is omitted, the first and second query may be the same (e.g., where the first and second queries are both query 580).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
generate a bloom filter associated with a database of uniform resource locator (URL) information, wherein the database of URL information includes, for a given URL included in the database, at least one categorization of the given URL;
receive, from a client device, a request to access a first URL;
determine that a representation of the first URL is not present in a first cache and in response insert a temporary entry into the first cache, wherein the temporary entry indicates that a categorization of the first URL is being resolved, and wherein any additional requests received for access to the first URL will be queued pending a resolution;
match the representation associated with the first URL against the bloom filter;
determine that a false positive response, incorrectly indicating that the database includes a categorization for the first URL, is returned by the bloom filter, at least in part by:
in response to receiving an "accept" as a result of the match against the bloom filter, performing a first query of a first data source that is different from the bloom filter, and receiving a "no match" result for the first query from the first data source;
in response to determining that the bloom filter returned a false positive response, determine a modification to make to the first query and use the modification to perform a second query, wherein the modification comprises at least one of: altering a query string, and altering a query source; and based at least in part on a category received as a result of the second query:
update the temporary cache entry, at least in part by: associating the received category with the first URL in the first cache, and cease to indicate that the categorization of the first URL is being resolved; and
enforce a policy with respect to the request to access the first URL; and a memory coupled to the processor and configured to provide the processor with instructions.

2. The system of claim 1 wherein the first data source comprises a second cache, and wherein the second cache is associated with the database.

3. The system of claim 1 wherein the first data source comprises the database.

4. The system of claim 1 wherein the second query comprises the first URL.

5. The system of claim 1 wherein the second query is performed against a database that is not associated with the bloom filter.

6. The system of claim 1 wherein the second query is performed against a second cache and wherein the second cache is not associated with the database.

7. The system of claim 1 wherein the representation associated with the first URL comprises an MD5 hash of at least a portion of the first URL.

8. The system of claim 1 wherein the processor is further configured to rewrite the first URL.

9. The system of claim 8 wherein the processor is configured to match the rewritten URL against the bloom filter.

10. A method, comprising:
generating a bloom filter associated with a database of uniform resource locator (URL) information, wherein the database of URL information includes, for a given URL included in the database, at least one categorization of the given URL;
receiving, from a client device, a request to access a first URL;
determining that a representation of the first URL is not present in a first cache and in response insert a temporary entry into the first cache, wherein the temporary entry indicates that a categorization of the first URL is being resolved, and wherein any additional requests received for access to the first URL will be queued pending a resolution;
matching the representation associated with the first URL against the bloom filter;
determining that a false positive response, incorrectly indicating that the database includes a categorization for the first URL, is returned by the bloom filter, at least in part by:
in response to receiving an "accept" as a result of the match against the bloom filter, performing a first query of a first data source that is different from the bloom filter, and receiving a "no match" result for the first query from the first data source;
in response to determining that the bloom filter returned a false positive response, determining a modification to make to the first query and using the modification to perform a second query, wherein the modification comprises at least one of: altering a query string, and altering a query source; and
based at least in part on a category received as a result of the second query:
updating the temporary cache entry at least in part by: associating the received category with the first URL in the first cache, and ceasing to indicate that the categorization of the first URL is being resolved; and
enforcing a policy with respect to the request to access the first URL.

11. The method of claim 10 wherein the first data source comprises the database.

12. The method of claim 10 wherein the second query comprises the first URL.

13. The method of claim 10 wherein the second query is performed against a database that is not associated with the bloom filter.

14. The method of claim 10 further comprising rewriting the first URL.

15. The method of claim 14 further comprising matching the rewritten URL against the bloom filter.

16. The method of claim 10 wherein the first data source comprises a second cache, and wherein the second cache is associated with the database.

17. The method of claim 14 wherein the second query is performed against a second cache and wherein the second cache is not associated with the database.

18. The method of claim 14 wherein the representation associated with the first URL comprises an MD5 hash of at least a portion of the first URL.

19. The method of claim 14 further comprising performing a hashing operation on at least a portion of the first URL to obtain a first hash value, and wherein matching the first hash against the bloom filter includes generating a second hash using the first hash value.

20. A computer program product embodied in a physical non-transitory computer readable storage medium and comprising computer instructions for:
generating a bloom filter associated with a database of uniform resource locator (URL) information, wherein the database of URL information includes, for a given URL included in the database, at least one categorization of the given URL;
receiving, from a client device, a request to access a first URL;
determining that a representation of the first URL is not present in a first cache and in response insert a temporary entry into the first cache, wherein the temporary entry indicates that a categorization of the first URL is being resolved, and wherein any additional requests received for access to the first URL will be queued pending a resolution;
matching the representation associated with the first URL against the bloom filter;
determining that a false positive response, incorrectly indicating that the database includes a categorization for the first URL, is returned by the bloom filter, at least in part by:
in response to receiving an "accept" as a result of the match against the bloom filter, performing a first query of a first data source that is different from the bloom filter, and receiving a "no match" result for the first query from the first data source;
in response to determining that the bloom filter returned a false positive response, determining a modification to make to the first query and using the modification to perform a second query, wherein the modification comprises at least one of: altering a query string, and altering a query source; and
based at least in part on a category received as a result of the second query:

updating the temporary cache entry at least in part by:
   associating the received category with the first URL in the first cache, and ceasing to indicate that the categorization of the first URL is being resolved; and
enforcing a policy with respect to the request to access the first URL.

21. The system of claim 1 wherein the processor is further configured to perform a hashing operation on at least a portion of the first URL to obtain a first hash value, and wherein matching the first hash against the bloom filter includes generating a second hash using the first hash value.

* * * * *